(12) United States Patent
Rothman et al.

(10) Patent No.: US 8,631,259 B2
(45) Date of Patent: *Jan. 14, 2014

(54) METHOD AND APPARATUS FOR QUICK RESUMPTION OF A PROCESSING SYSTEM WITH VOLATILE MEMORY

(71) Applicant: Intel Corporation, Santa Clara, CA (US)

(72) Inventors: Michael Rothman, Puyallup, WA (US); Glenn Hinton, Portland, OR (US); Vincent Zimmer, Federal Way, WA (US); Michael Kinney, Olympia, WA (US); Mark Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,245

(22) Filed: Feb. 11, 2013

(65) Prior Publication Data

US 2013/0151876 A1 Jun. 13, 2013

Related U.S. Application Data

(63) Continuation of application No. 12/384,673, filed on Apr. 7, 2009, now Pat. No. 8,407,489, which is a continuation of application No. 11/229,126, filed on Sep. 15, 2005, now Pat. No. 7,523,323.

(51) Int. Cl.
*G06F 9/24* (2006.01)
*G06F 15/177* (2006.01)

(52) U.S. Cl.
USPC .................................. 713/300; 713/1; 713/2

(58) Field of Classification Search
USPC .................................................. 713/1, 2, 300
See application file for complete search history.

(56) References Cited

U.S. PATENT DOCUMENTS

| | | |
|---|---|---|
| 5,696,897 A | 12/1997 | Dong |
| 5,778,443 A | 7/1998 | Swanberg et al. |
| 6,347,370 B1 | 2/2002 | Grimsrud |
| 6,393,584 B1 | 5/2002 | McLaren et al. |
| 6,493,828 B1 | 12/2002 | Yamaguchi et al. |

(Continued)

FOREIGN PATENT DOCUMENTS

| | | |
|---|---|---|
| CN | 1530796 A | 9/2004 |
| WO | 2007/040806 A1 | 4/2007 |

OTHER PUBLICATIONS

Office Action received for U.S. Appl. No. 11/229,126, mailed on Dec. 7, 2007, 15 pages.

(Continued)

*Primary Examiner* — Vincent Tran
(74) *Attorney, Agent, or Firm* — Barre Law Firm, PLLC

(57) ABSTRACT

When transitioning from sleep mode to active mode, a processing system loads first stage resume content and second stage resume content into a volatile memory of the processing system. The first stage resume content may contain contextual data for a first program that was in use before the processing system transitioned to sleep mode. The second stage resume content may contain contextual data for another program that was in use before the processing system transitioned to sleep mode. The processing system may provide a user interface for the first program before all of the second stage resume content has been loaded into the volatile memory. Other embodiments are described and claimed.

20 Claims, 6 Drawing Sheets

(56) References Cited

U.S. PATENT DOCUMENTS

| | | | |
|---|---|---|---|
| 6,546,472 B2 | 4/2003 | Atkinson et al. | |
| 6,609,182 B1 | 8/2003 | Pedrizetti et al. | |
| 6,647,472 B2 | 11/2003 | Atkinson et al. | |
| 6,832,311 B2 | 12/2004 | Morisawa | |
| 6,851,012 B2 | 2/2005 | Yamashima | |
| 7,181,609 B2 | 2/2007 | Connor et al. | |
| 7,225,448 B2 | 5/2007 | Himmel et al. | |
| 7,240,189 B2 | 7/2007 | Mowery et al. | |
| 7,299,346 B1 * | 11/2007 | Hollis | 713/2 |
| 7,523,323 B2 | 4/2009 | Rothman et al. | |
| 7,987,336 B2 * | 7/2011 | Kirscht et al. | 711/173 |
| 2002/0038328 A1 | 3/2002 | Morisawa | |
| 2002/0083369 A1 * | 6/2002 | Schelling | 714/36 |
| 2002/0087816 A1 | 7/2002 | Atkinson et al. | |
| 2002/0103984 A1 | 8/2002 | Yamashima | |
| 2003/0131206 A1 | 7/2003 | Atkinson et al. | |
| 2004/0098578 A1 | 5/2004 | Funayama | |
| 2004/0143696 A1 | 7/2004 | Hsieh | |
| 2004/0158701 A1 * | 8/2004 | Merkin | 713/2 |
| 2004/0230784 A1 | 11/2004 | Cohen | |
| 2005/0038933 A1 | 2/2005 | Himmel et al. | |
| 2005/0038981 A1 | 2/2005 | Connor et al. | |
| 2005/0216721 A1 * | 9/2005 | Zimmer et al. | 713/2 |
| 2005/0246565 A1 | 11/2005 | Koarai | |
| 2006/0027644 A1 | 2/2006 | Takashi et al. | |
| 2006/0265437 A1 | 11/2006 | Coulson | |
| 2007/0061556 A1 | 3/2007 | Rothman et al. | |

OTHER PUBLICATIONS

Office Action received for U.S. Appl. No. 11/229,126, mailed on Jun. 25, 2008, 12 pages.

Office Action received for Chinese Patent Application No. 200680033757.4, mailed on Dec. 2, 2010, 11 pages of English translation only.

Office Action received for Chinese Patent Application No. 200680033757.4, mailed on Jan. 8, 2010, 14 pages of English translation only.

Office Action received for Chinese Patent Application No. 200680033757.4, mailed on Mar. 14, 2011, 11 pages of English translation and 3 pages of Chinese Office Action.

Office Action received for Chinese Patent Application No. 200680033757.4, mailed on Aug. 20, 2010, 3 pages of English translation and 4 pages of Chinese Office Action.

"Revision 3.0 of the ACPI Specification", may be obtained from www.acpi.info/spec.htm, Sep. 2, 2004.

Intel, "Intel Architecture Software Developer's Manual", Chapter 12, vol. 3-System Programming, 1999, 36 pages.

Fukui et al., "Method of High-Speed Hibernation", IBM Technical Disclosure Bulletin, vol. 38, No. 1, Jan. 1995, pp. 443-444.

International Preliminary Report on Patentability received for PCT Patent Application No. PCT/US2006/030182, mailed on Mar. 27, 2008, 8 pages.

International Search Report and Written Opinion received for PCT Patent Application No. PCT/US20061030182, mailed on Dec. 13, 2006, 12 pages.

International Preliminary Report on Patentability received for PCT Patent Application No. PCT/US2006/030523, mailed on Mar. 27, 2008, 7 pages.

International Search Report and Written Opinion for PCT Patent Application No. PCT/US2006/030523, mailed on Feb. 1, 2007, 11 pages.

Office Action received for U.S. Appl. No. 12/384,673, mailed on Apr. 11, 2011, 10 pages.

Office Action received for U.S. Appl. No. 12/384,673, mailed on Aug. 17, 2011, 12 pages.

Office Action received for U.S. Appl. No. 12/384,673, mailed on Dec. 13, 2011, 11 pages.

* cited by examiner

METHOD AND APPARATUS FOR QUICK RESUMPTION OF A PROCESSING SYSTEM WITH VOLATILE MEMORY

CROSS REFERENCE TO RELATED APPLICATION

This application is a continuation of U.S. patent application Ser. No. 12/384,673, filed Apr. 7, 2009, entitled "Method and Apparatus for Quick Resumption," which in turn is a continuation of U.S. patent application Ser. No. 11/229,126, filed Sep. 15, 2005, entitled "Method and Apparatus for Quick Resumption." Those applications are both entirely incorporated herein by reference.

FIELD OF THE INVENTION

The present disclosure relates generally to the field of data processing, and more particularly to methods and related apparatus for quickly resuming a processing system from a sleeping state.

BACKGROUND

The Advanced Configuration and Power Interface (ACPI) is an open industry specification that describes industry-standard interfaces for configuration and power management on processing systems such as laptop, desktop, and server computers. Revision 3.0 of the ACPI Specification, dated Sep. 2, 2004, may be obtained from www.acpi.info/spec.htm. The ACPI specification describes various sleep states and global power states. The present invention, however, is not limited to ACPI-compliant systems, but may be used to advantage in any suitable processing system.

For purposes of this disclosure, a processing system can be in one of three power states: active, sleeping, or off. The sleeping state may also be referred to as a state of hibernation, or as sleep mode.

In the off state, the system is powered down, and the system does not contain system context for restoring processes from an earlier active state. To transition from the off state to the active state, the boot firmware must initialize the hardware and boot an OS.

In the active state, the system dispatches and executes threads. The system typically responds to external events substantially in real time—subject to delays attributable to factors such as the workload and the performance limits of the processing system. Nevertheless, various performance and power characteristics of the system may be dynamically adjusted within the active state. For instance, the power state of individual devices within the system may be changed dynamically when the processing system is in the active state. The active state may also be referred to as active mode.

When in the sleeping state, the processing system does not execute user mode threads, and the system consumes less power than in the active state. The system may appear to be off, in that various peripheral devices or indicators (e.g., the display, certain light emitting diodes (LEDs), etc.) may be powered down. In some circumstances, the processing system may consume no power or substantially no power in the sleeping state. However, while in the sleeping state, the processing system preserves data pertaining to the processes that were executing in the active state (i.e., system context). The processing system can typically transition to the active state from the sleeping state more quickly than from the off state. For instance, in some implementations, a processing system may transition from the sleeping state to the active state without rebooting the operating system (OS).

To resume is to transition from the sleeping state to the active state.

Conventional processing systems may take over 60 seconds to resume. For example, a processing system with 3.4 gigabytes (GB) of random access memory (RAM) may take approximately 150 seconds to transition from non-powered sleep mode to active mode. Most of that time may be devoted to restoring the system context to RAM from a hard disk drive. As the amount of memory in the average processing system increases, the amount of time needed to resume the average processing system may also increase. If a person desires to use a processing system, waiting for that processing system to resume is typically neither fun nor productive for that person. As recognized by the present invention, it would be advantageous to reduce the amount of time needed to resume a processing system.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
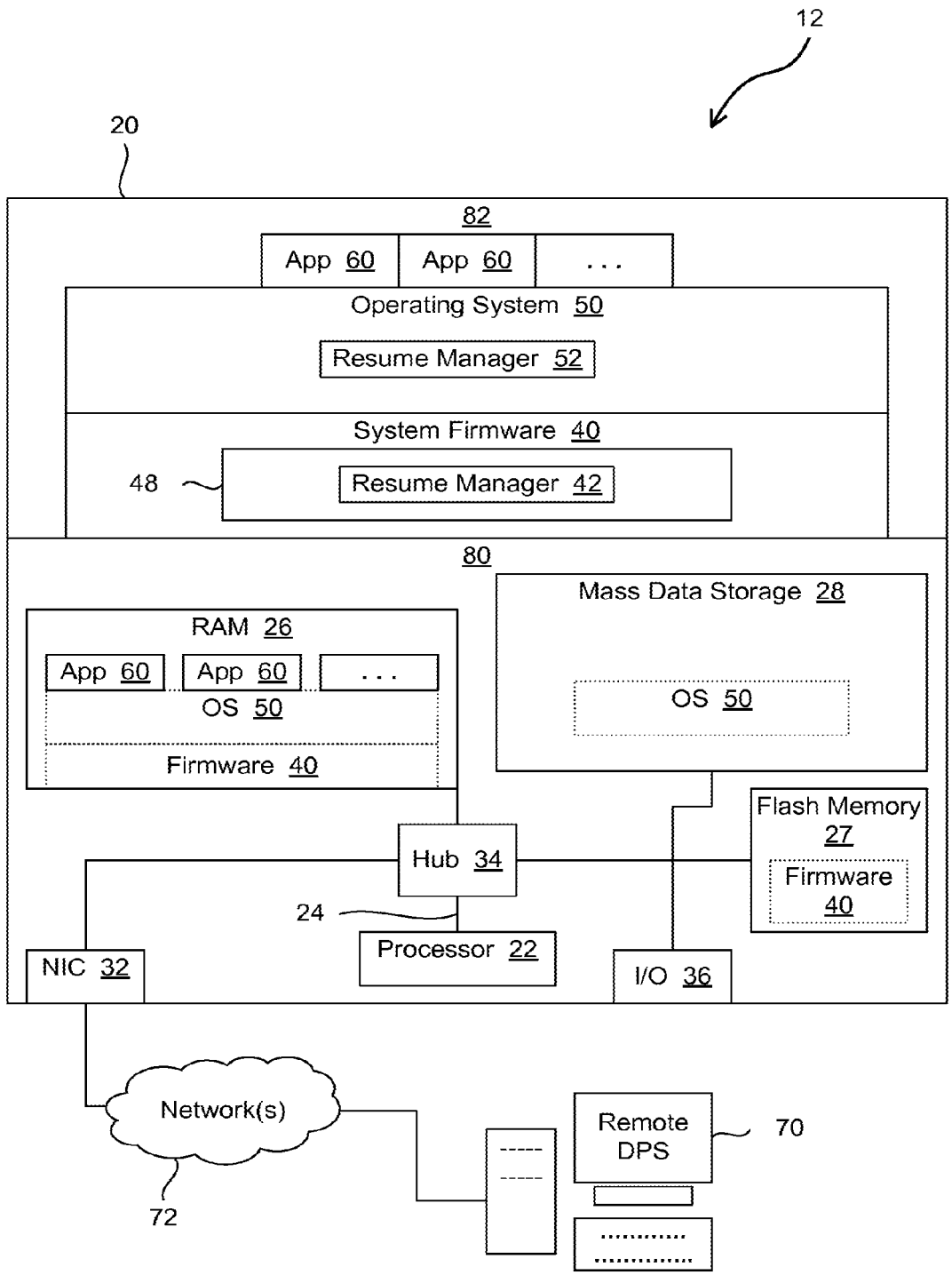
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, one or more processors or central processing units (CPUs) 22 communicatively coupled to various other components via one or more system buses 24 or other communication pathways or mediums.

As used herein, the terms "processing system" and "data processing system" (DPS) are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives received from other processing systems or other input sources or signals. Processing system 20 may utilize one or more connections to one or more remote data processing systems 70, for example through a network interface controller (NIC) 32, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 22 may be communicatively coupled to one or more volatile or non-volatile data storage devices, such as random access memory (RAM) 26, flash memory 27, mass storage devices 28 such as integrated drive electronics (IDE) or small computer system interface (SCSI) hard drives, and/or other devices or media, such as floppy disks, optical storage, tapes, read-only memory (ROM), memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, SCSI controllers, network controllers, universal serial bus (USB) controllers, input devices such as a keyboard, a mouse, a camera, etc. Processing system 20 may also include one or more bridges or hubs 34, such as a memory controller hub, an input/output (I/O) controller hub, a PCI root bridge, etc., for communicatively coupling system components. As used herein, the term "bus" includes pathways that may be shared by more than two devices, as well as point-to-point pathways.

Some components, such as NIC 32, for example, may be implemented as adapter cards with interfaces (e.g., a PCI connector) for communicating with a bus. Alternatively, NIC 32 and other devices may be implemented as embedded controllers, using components such as programmable or non-programmable logic devices or arrays, application-specific integrated circuits (ASICs), embedded computers, smart cards, and the like.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, modules, drivers, subprograms, processes, and other types of software components.

For instance, data storage device 28 and/or flash memory 27 may include various sets of instructions which, when executed, perform various operations. Such sets of instructions may be referred to in general as software.

As illustrated in FIG. 1, in the example embodiment, the programs or software components 82 may include system firmware 40 and an OS 50. System firmware 40 may include one or more routines, such as boot firmware 48, for managing the boot process. For purposes of this disclosure, the term "system firmware" includes the boot firmware for the platform, as well as any additional platform firmware that may operate after the OS boot code has been called. As described in greater detail below, system firmware 40 and operating system 50 may include respective resume management routines 42 and 52 for enabling processing system 20 to resume quickly from a sleeping state to an active state.

Figure 2:
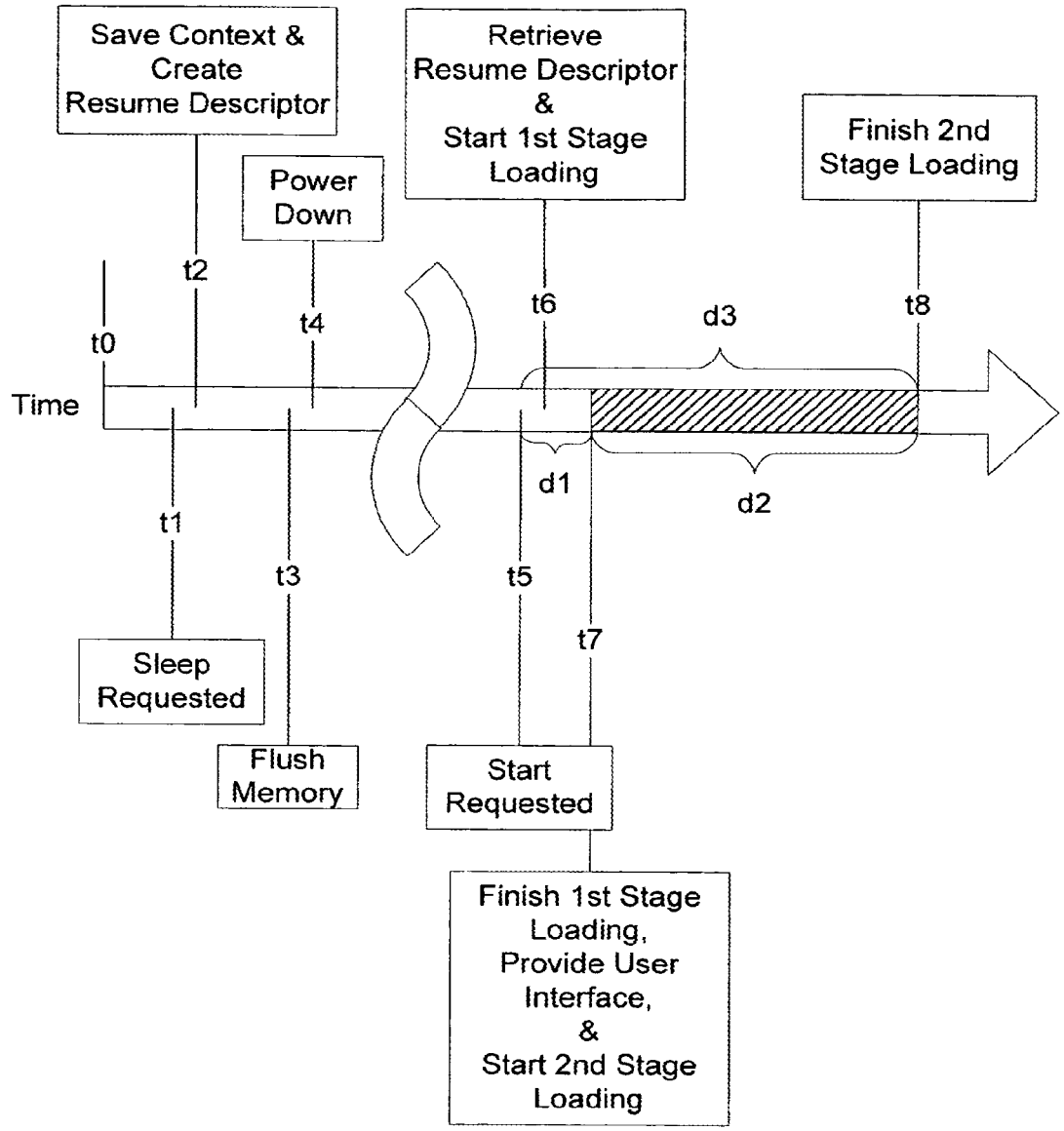
FIG. 2 depicts a timeline illustrating when various operations for quickly resuming a data processing system may be performed according to an example embodiment of the present invention.

FIG. 2 depicts a timeline illustrating when various operations for quickly resuming a data processing system may be performed according to an example embodiment of the present invention. With regard also to FIG. 1, the timeline of FIG. 2 may begin at time t0 with processing system 20 in an active state. At time t1 OS 50 may determine that processing system 20 should be transitioned to sleep mode. Such a determination may be made in response to conditions such as a predetermined period of inactivity, user input selecting sleep mode, etc.

At time t2, OS 50 saves the current system context to nonvolatile storage and creates a resume descriptor to be saved in nonvolatile storage and used in subsequent operations for quickly resuming processing system 20. As described in greater detail below, the system context may be saved in two or more parts, and the resume descriptor may include data to be used by OS 50 when resuming processing system 20. The resume descriptor may also include data to be used by system firmware 40 when resuming processing system 20.

For instance, OS 50 may populate the resume descriptor with data identifying different sets of content for different stages in the resume process. Those stages may include a first stage for restoring system context for only a subset of the processes that were active at time t1, and a second stage (or multiple secondary stages) for restoring system context for the remaining processes that were active at time t1.

Figure 3:
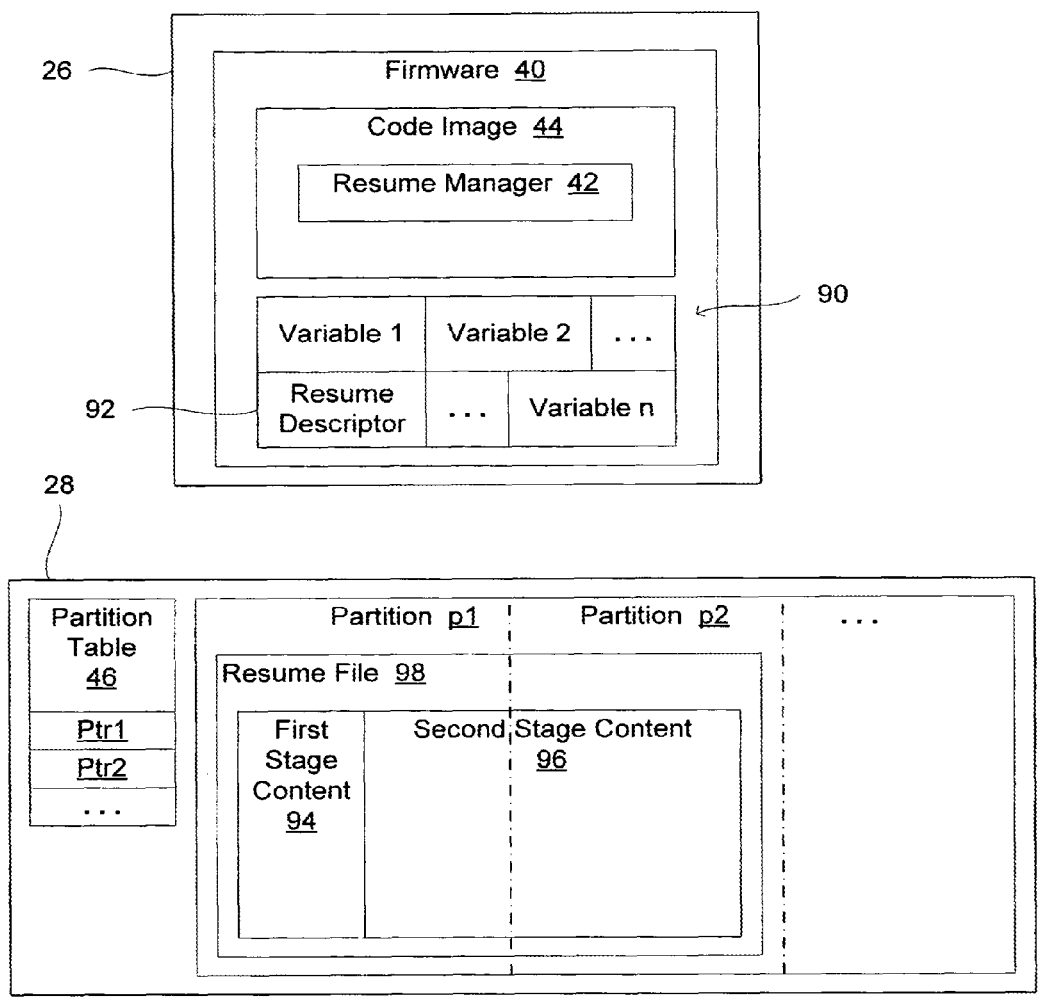
FIG. 3 is a block diagram depicting various data constructs that may be used to support quick resumption of a processing system according to an example embodiment of the present invention.

FIG. 3 is a block diagram depicting various data constructs that may be used to support quick resumption of a processing system according to an example embodiment of the present invention. In particular, FIG. 3 depicts the hard disk 28 of processing system 20, with various partitions (e.g., partitions p1 and p2) containing data (e.g., system context) to be used for resuming processing system 20. That content may be referred to as a resume file 98. In one example embodiment, resume file 98 includes first stage content 94 and second stage content 96, to be loaded during resumption of processing system 20 in consecutive first and second stage loading steps, respectively. As described in greater detail below, in another embodiment, the first stage content and the second stage content may be stored in different storage devices. Nevertheless, for purposes of brevity, the term "resume file" as used herein includes any collection of resume data, even if all portions of that collection do not reside in the same physical file or even on the same storage device. Hard disk 28 may also include a partition table 46 with pointers to partitions such as p1, p2, etc., as well as other data.

FIG. 3 also depicts system firmware 40 residing in flash memory 27, with the resume descriptor 92 saved in flash as a firmware variable, along with other firmware variables 90 (e.g., a firmware variable to identify the language to be used for user interfaces, a firmware variable to specify primary and secondary boot devices, etc.). In some embodiments, the system firmware for processing system 20 complies with the Extensible Firmware Interface (EFI) Specification, Version 1.10, dated Nov. 26, 2003 (hereinafter "EFI Specification"). The EFI Specification may be obtained from www.intel.com/technology/efi. In such embodiments, resume descriptor 92 may be similar to firmware constructs such as EFI configuration tables. In some embodiments, the structure of the resume descriptor is predefined by the system firmware. In other embodiments, the OS uses the system firmware to create the resume descriptor.

In addition to firmware variables, other data may be stored in flash memory 27, such as the code image 44 for system firmware 40. In alternative embodiments, the resume descriptor may be stored in any suitable predetermined nonvolatile location (e.g., in a file resident on a system partition of a hard drive). Similarly, according to the present invention, resume descriptors are not limited to the particular structure illustrated herein, but in alternative embodiments may use any suitable data structure or combination of data structures, stored in any suitable non-volatile storage device or devices. Alternative embodiments may also use a single data structure to hold both the resume descriptor and the first stage content.

Returning now to the timeline illustrated in FIG. 2, in the example embodiment, after resume descriptor 92 has been created, OS 50 causes processing system 20 to flush RAM 26 at time t3, to make sure the current context is properly saved. Then, at time t4, OS 50 partially or completely powers down processing system 20. Consequently, processing system 20 enters the sleeping state at time t4. Processing system 20 may then stay in the sleeping state for an indefinite period of time, from seconds to months or years.

At time t5, processing system 20 detects a start event, for example in response to a user pushing a power button of processing system 20. System firmware 40 then retrieves resume descriptor 92 and determines how to respond to the start event, based at least in part on the information that OS 50 saved in resume descriptor 92. For instance, resume descriptor 92 may include data that instructs system firmware 40 to skip the initialization of one or more specified devices, to initialize only a particular portion of RAM 26, etc. The data in resume descriptor 92 that indicates which resume operations should be performed by the OS may be referred to as the resume descriptor handshake. In various embodiments, the resume descriptor handshake may assign to the OS any operation or combination of operations that need not be performed before the first stage loading is performed. System firmware 40 may then initialize processing system 20 in accordance with the data in resume descriptor 92, and system firmware 40 may then pass control to boot code of OS 50.

Processing system 20 may thus abbreviate the firmware-controlled initialization process, to effect a quicker return to an OS context. Initialization operations may be offloaded from system firmware 40 to OS 50 via a handshake or contract communicated through a predetermined conduit, such as a firmware variable or some other communication path.

At time t6, OS 50 may retrieve the resume descriptor 92 and start the first stage loading process for restoring some of the context from the previous active state. In the example embodiment, OS 50 loads first stage content 94 from hard disk 28 into RAM 26 during the first stage loading, and first stage content 94 contains the context for only a subset of the processes that existed in processing system 20 when processing system was last in the active state. For instance, first stage content 94 may contain the contextual data for only the last active user program (e.g., the last program to receive user input or to have system focus). The first stage data may contain all of the paged and non-paged data for the last active user program, or only the non-paged data. In another embodiment, first stage content 94 may contain the contextual data for all programs that were not paged out of memory when processing system 20 was last active. In alternative embodiments, other subsets of the system context may be saved in the first stage content and restored in the first stage loading. For instance, the first stage data may contain, in addition to any of the above subsets, all of the non-paged OS data. The non-paged OS data may also be referred to as non-paged kernel data.

Alternatively, first stage content 94 may have been saved to flash memory 27. OS 50 may therefore restore first stage content 94 from flash memory 27 into RAM 26. Furthermore, OS 50 may have populated resume descriptor 92 with data indicating that system firmware 40 should skip the initialization steps normally executed to support communication with hard disk 28. OS 50 may perform those initialization steps after the first stage loading is complete.

As indicated at time t7, once the first stage loading process is complete, processing system generates a user interface and is ready to receive input from the user and execute user mode threads. For instance, processing system 20 may prompt the user to enter credentials, and upon receipt and verification of those credentials, processing system 20 may provide the user interface for the last application that the user utilized before processing system 20 entered sleep mode.

In FIG. 2, the time between t5 and t7 is labeled as duration d1. Accordingly, in the example embodiment, duration d1 is the amount of time taken by processing system 20 to resume from a non-powered sleep mode.

OS 50 may then start the second stage loading of the platform context, for instance as a background task. In the example embodiment, the first stage content is smaller than the second stage content, and the first stage loading takes less time than the second stage loading.

At time t8 processing system 20 may finish the second stage loading, and the resumption process may then be complete. The time between t7 and t8 is labeled as duration d2, and the time between t5 and t8 is labeled as duration d3. Duration d3 thus equals duration d1 plus duration d2. In the example embodiment, processing system 20 is ready to use after duration d1. By contrast, duration d3 (i.e., the total time between t5 and t8) may be similar to the amount of time need to transition a processing system from sleep mode to active mode according to conventional resumption processes. However, a processing system that uses a conventional approach to resuming is not usable until all of the system context has been loaded. By contrast, according to the example embodiment, the person using processing system 20 need not wait long before he or she can start using processing system 20 for productive work, since the context is restored in multiple stages, and processing system does not wait until all of those stages have finished before generating a user interface.

Figure 4:
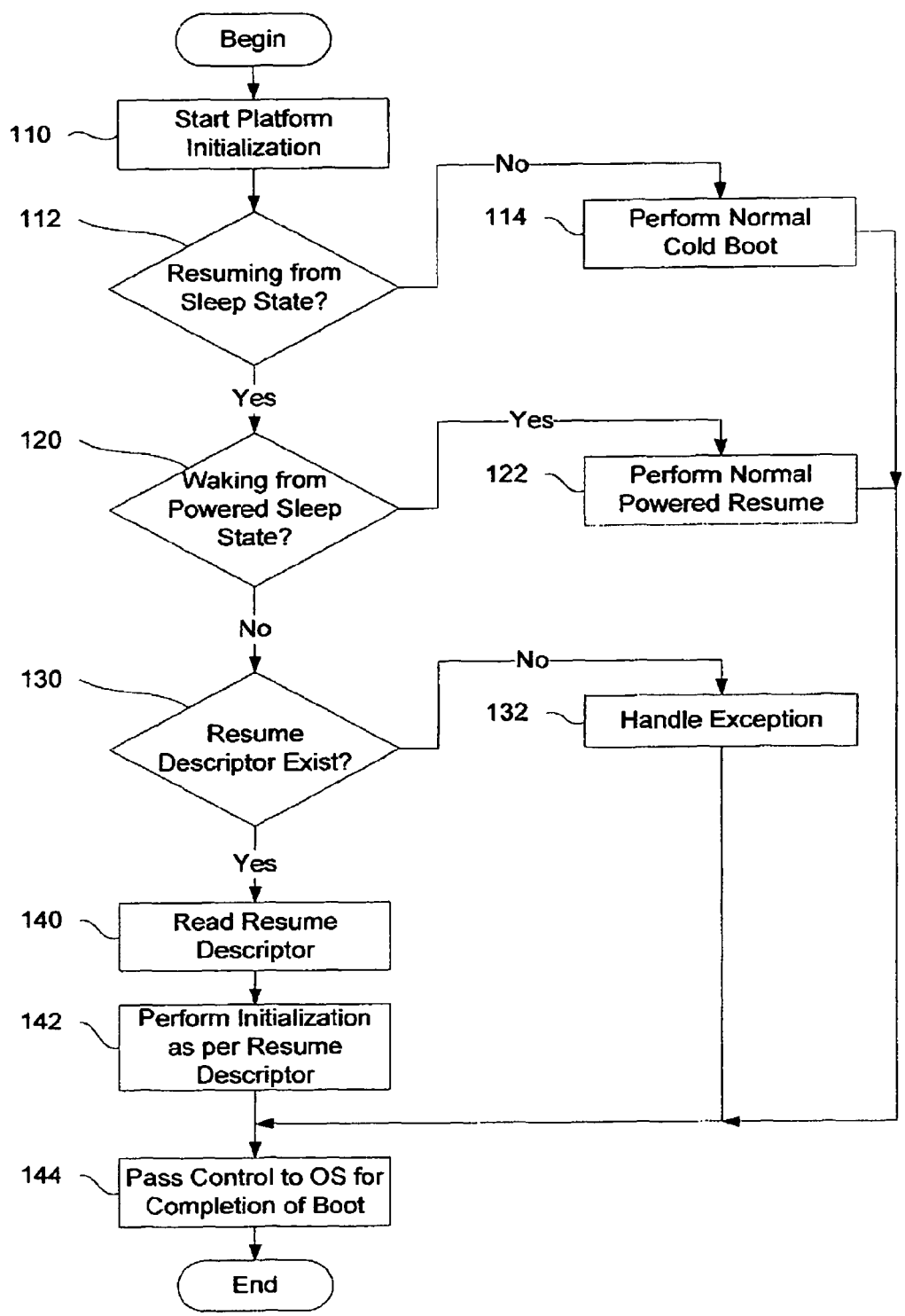
FIGS. 4, 5, and 6 are flowcharts depicting various aspects of a process for supporting quick resumption according to an example embodiment of the present invention.
Figure 5:
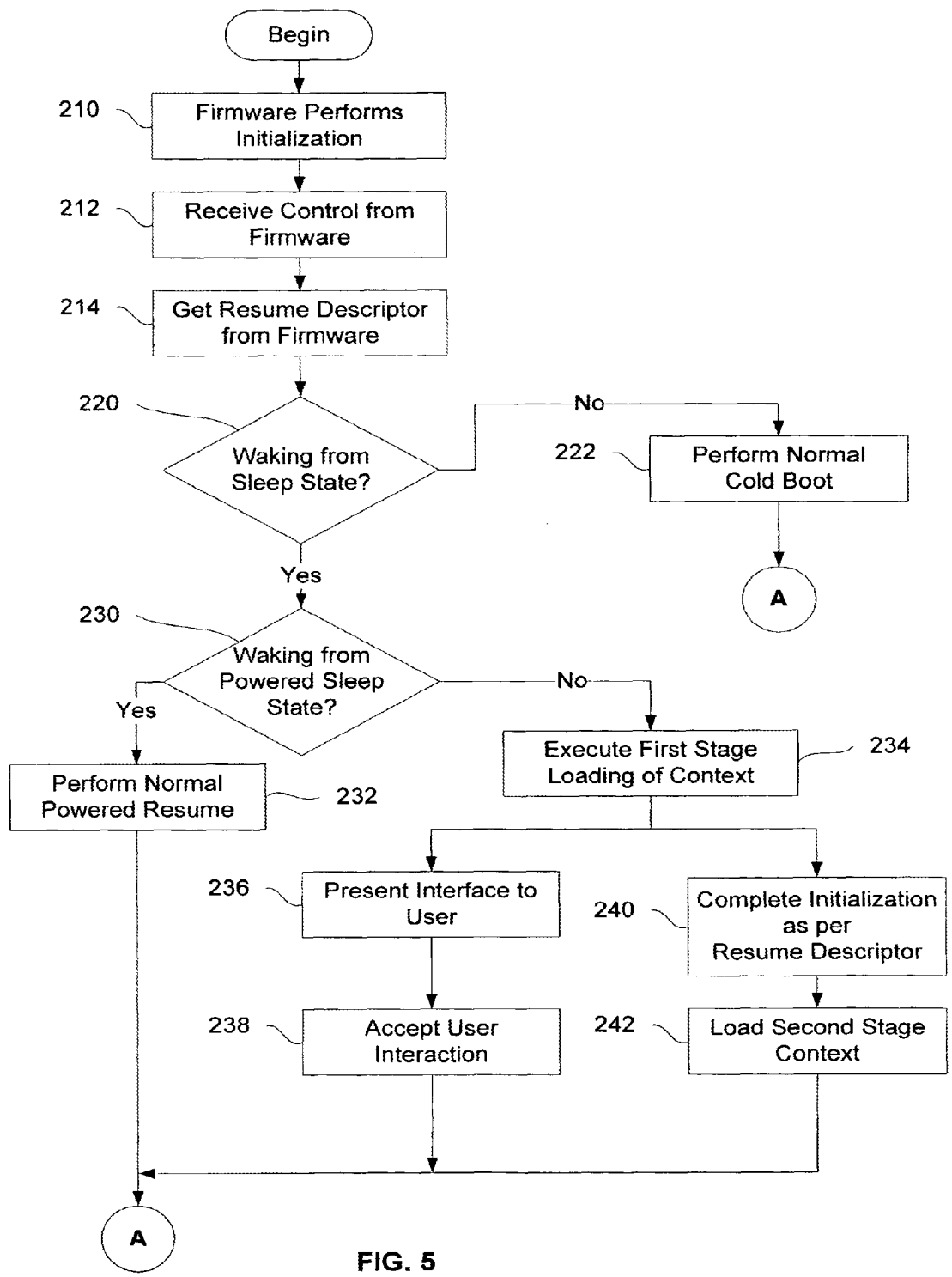
Figure 6:
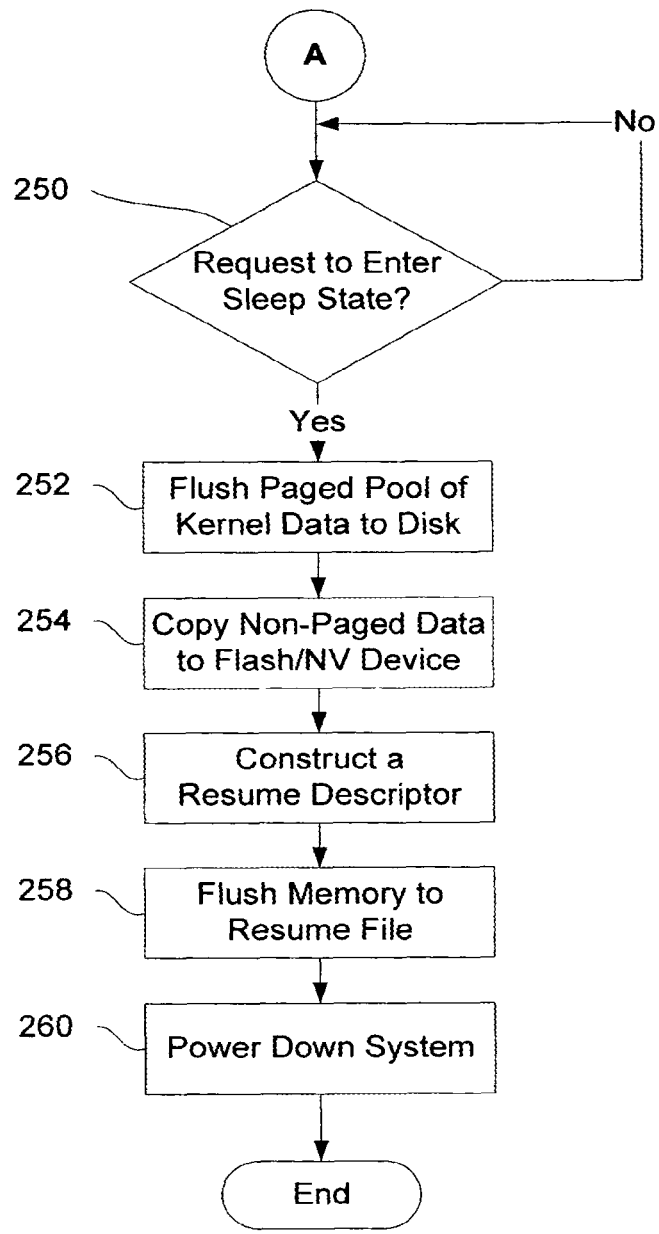

FIGS. 4, 5, and 6 are flowcharts depicting various aspects of a process for supporting quick resumption according to an example embodiment of the present invention. The process depicted in FIG. 4 begins with processing system 20 detecting a start event, for instance as described above with regard to FIG. 2 and time t5. In response to the start event, boot firmware 48 starts initializing processing system 20, as indicated at block 110. As part of that initialization process, as indicated at block 112, system firmware 40 determines whether processing system 20 is resuming from a sleeping state. If processing system 20 is not resuming from a sleeping state, system firmware 40 completes the initialization of processing system 20 using a hard boot or cold boot process (i.e., a process for transitioning from the off state to the active state), as indicated at block 114. As depicted at block 144, system firmware 40 may then pass control to OS 50 for the remainder of the boot process.

However, if processing system 20 is resuming from a sleeping state, system firmware 40 next determines whether processing system is coming from a powered or a non-powered sleep state, as depicted at block 120. If processing system 20 is resuming from a powered sleep state, system firmware 40 may use a more or less conventional approach for resuming from powered sleep to finish initializing processing system 20, as indicated at block 122. System firmware 40 may then pass control to OS 50 for the remainder of the boot process, as depicted at block 144.

However, as indicated at block 130, if processing system 20 is coming from a non-powered sleep state, system firmware 40 may then determine whether OS 50 saved a resume descriptor when preparing to enter the sleeping state. If system firmware 40 does not find a resume descriptor, system firmware 40 may raise an exception and/or may perform error processing, as depicted at block 132. For instance, system firmware 40 may perform operations such as providing output to notify the user or a remote administrator about the error, saving a log entry identifying the error, reverting to the hard boot or cold boot process, or any suitable combination of these or other operations.

If the resume descriptor does exist, system firmware 40 reads the resume descriptor (e.g., resume descriptor 92), as depicted at block 140. As shown at block 142 and described above, system firmware 40 may then complete its part of the initialization process in accordance with the information saved in resume descriptor 92 by OS 50. For instance, if resume descriptor 92 indicates that OS 50 will initialize a certain device or portion of memory, system firmware 40 may save time by not initializing that device or that portion of memory. In one embodiment, resume descriptor 92 lists the initialization operations to be performed by components other than system firmware 40. In other embodiments, resume descriptor 92 uses other techniques to indicate which initialization operations are to be performed by system firmware 40. In either case, resume descriptor 92 may describe a minimal pathway for platform initialization to support quickly restoring the first stage content. As indicated at block 144, after performing any required initialization operations, system firmware 40 may then pass control to boot code of OS 50.

The process depicted in FIG. 5 begins after system firmware 40 has detected a start event. At block 210, system firmware 40 may perform system initialization according to the process depicted in FIG. 4. At block 212, OS 50 may receive control from system firmware 40, in accordance with the operation illustrated at block 144 of FIG. 4. At block 214, OS 50 may retrieve resume descriptor 92 from nonvolatile storage. For instance, in the example embodiment, OS 50 retrieves resume descriptor 92 from a persistent firmware variable (i.e., a variable that is provided by the system firmware, and that can be subsequently retrieved from the system firmware even if the processing system is powered down between the time the variable is saved and the time it is retrieved).

As depicted at block 220, OS 50 may then determine whether processing system 20 is resuming from a sleeping state. If processing system 20 is not resuming from a sleeping state, OS 50 may perform a hard boot or cold boot, as indicated at block 222. As depicted at block 222, if processing system 20 is resuming from a sleeping state, OS 50 may determine whether processing system 20 is resuming from a power sleep state or a non-powered sleep state, as depicted at block 230. If processing system 20 is resuming from a powered sleep state, OS 50 may perform a more or less conventional powered resume, as indicated at block 232.

However, if processing system 20 is resuming from a non-powered sleep state, the process may pass from block 230 to block 234, which depicts OS 50 causing processing system 20 to execute first stage loading of context. In some embodiments, a data processing system may decide to perform a two-stage (or multi-stage) loading process in response to detecting a resume descriptor. Referring again to FIG. 3, in the example embodiment, when performing the first stage loading, OS 50 may load first stage content 94 from nonvolatile storage such as hard disk 28 into RAM 26. As explained above, first stage content 94 may include the system context for the last program that received user input, the last program that had system focus, all programs that were not paged out of memory, or some other subset of the programs that existed in processing system 20 before processing system 20 entered sleep mode.

As indicated by the dual paths exiting from block 234, after loading the first stage content, OS 50 may begin second stage load operations, while also providing a user interface to allow processing system 20 to be used before the second stage load is complete. For instance, as indicated at block 236, after loading first stage content 94, OS 50 may begin executing user mode threads, for example to present an interface to the user. If the first stage content included the context for the last program to receive user input, OS 50 may return control to that program after restoring the context for that program, thereby allowing the user to resume use of that program as if processing system 20 had never transitioned to sleep mode. Further, as indicated at block 238, processing system 20 may then receive input such as user input. Thus processing system 20 provides for user interaction before the secondary load process has been completed. Consequently, a person may use processing system 20 before the entire system context (i.e., the contextual data for all of the processes or programs that existed before processing system 20 entered sleep mode) has been restored.

As indicated at blocks 240 and 242, simultaneously or substantially simultaneously with providing a user interface and accepting user interaction, OS 50 may perform any further initialization operations required and may load second stage content 96. Those initialization operations may be duties assigned to the OS by resume descriptor 92. For example, resume descriptor 92 may include data indicating that OS 50 should initialize a specified portion or portions of RAM 26. The data in resume descriptor 92 that indicates which resume operations should be performed by the OS and which by the system firmware may be referred to as the resume descriptor handshake. In various embodiments, the resume descriptor handshake may assign to the OS any operation or combination of operations that need not be performed before the first stage loading is performed. Other examples of such operations may include, without limitation, initialization of a specified device or devices, etc.

The secondary load process may restore some or all of the remaining system context (e.g., second stage content 96 from resume file 98) into RAM 26. The resume process may end once all of the second stage content has been restored. In alternative embodiments, multiple secondary or supplemental stages may be used to load additional context after the first stage load.

Once the system has finished a hard boot, finished waking from a powered sleep state, or finished waking from a non-powered sleep state, the process may pass from FIG. 5 through page connector A to block 250 of FIG. 6. Processing system 20 may then determine whether there has been a power-state transition request to enter a non-powered sleeping state. For instance, such a determination may be made in response to a user selecting a sleep option, or in response to a predetermined amount of time passing with no user input.

When processing system 20 determines that a non-powered sleep mode should be entered, OS 50 may cause processing system to flush the paged pool of kernel data to non-volatile storage, such as hard disk 28, as indicated at block 252. The flush operation may ensure that all write-back disk caches have flushed. As indicated at block 254, OS 50 may also copy the non-paged data (or any other suitable subset of the current context) to the same or a different non-volatile device.

In one embodiment, OS 50 may consider all of the paged data to be the second stage content, and OS 50 may save that data to hard disk 28. All of the non-paged data, on the other hand, may be considered first stage content, and OS 50 may save that data to flash memory 27. In other embodiments, processing system may include three or more different non-volatile storage devices, and items such as the resume descriptor, the first stage content, and the second stage content may each be stored on a different device. Any suitable approach may be used for saving the second stage content. For example, OS 50 may create a log in second stage content 96 to identify the existing location(s) of the paged data, or OS 50 may coalesce the paged content to second stage content 96.

In the example embodiment, as indicated at block 256, OS 50 populates and saves resume descriptor 92 with information to be used for resuming processing system 20. For example, OS 50 may save information such as one or more of the following items in resume descriptor 92:

data describing initialization operations that OS 50 will perform, possibly including operations (e.g., memory initialization) that the boot firmware might ordinarily perform before booting the OS in a conventional system.

data describing attributes of the first stage load content, such as the location of that content, the size of that content, the type of device containing the content, etc.

information to be used by system firmware 40 when passing control to OS 50 during resume operations, for instance as depicted at block 212 of FIG. 5

In some embodiments, the OS may use facilities provided by system firmware to save the resume descriptor in nonvolatile storage. For instance, as described above, the resume descriptor data may be saved in a firmware variable (e.g., in variable 92, as depicted in FIG. 3).

Some embodiments may use structures like those described in the following code segments to implement a resume descriptor:

path (e.g., off of bus #1, peripheral component interconnect (PCI) device 7, function 0, partition 0) for the device containing the first stage content; (c) the number of distinct memory ranges/fragments to be restored; etc. A RESOURCE_DESCRIPTOR section may be used to store data identifying (a) the type of device (e.g., hard drive, flash memory, etc.) containing the first stage content; (b) the starting location of the first stage content on that device (e.g., the byte offset for a flash device or the LBA of the relevant sector for a hard drive); (c) the size of the first stage content; etc. Other information in the resume descriptor may include data to identify the different areas of data to be restored (e.g., the memory range from 1:22 MB, the memory range from 40:32 MB, etc.). In other embodiments, resume descriptors with different structures may be used.

When transitioning from sleep mode to active mode, before booting to OS 50, system firmware 40 may use the information in the resume descriptor that indicates which memory areas are to be restored to determine which memory areas are to be initialized by system firmware 40. For instance, system firmware 40 may initialize the memory areas that are to be restored, and may skip the initialization of other memory areas. Since system firmware 40 may initialization only a subset of RAM 26, the boot firmware may complete its initialization process more quickly.

Resume descriptor 92 may include additional structures to store the information identifying which initialization operations are to be skipped by system firmware 40 and performed by OS 50. For example, the INIT_MASK structure may include one or more bits to indicate whether system firmware 40 is to initialize all of memory or a subset of memory, data to indicate whether certain devices are to be initialized by system firmware 40 or OS 50, etc. In alternative embodiments, alternative mechanisms may be used to indicate which initialization operations are to be skipped by the system firmware and performed by the OS.

At block 258, OS 50 causes the contents of RAM 26 to be flushed to resume file 98. This flushing is to ensure that the stored contents of volatile components (e.g., memory, cache, CPU state) have been fully flushed to a nonvolatile store. In the example embodiment, first stage content 94 (see FIG. 3) includes the kernel data that is flushed to disk according to block 252, and second stage content 96 includes the data

```
typedef struct {
    UINT64              DevicePathActive:1;
    UINT64              FlashContainsMemory:1;
    UINT64              MemoryFragments:8;
    ...
} INIT_MASK;
typedef struct {
    UINT32              Type;
    UINT32              Pad;
    EFI_PHYSICAL_ADDR   PhysicalStart;    //LBA or Memory based on Type
    UINT64              NumberOfPages;    //If LBA==# of sectors
    UINT64              Bank;
} RESOURCE_DESCRIPTOR;
typedef struct {
    INIT_MASK           InitMask;
//DEVICE_PATH           DevicePath;
//UINT32                DescriptorCount;
//RESOURCE_DESCRIPTOR   ResourceDescriptor[DescriptorCount];
} EFI_RESUME_DESCRIPTOR;
```

Such a resume descriptor may have an INIT_MASK section for use in locating the first stage content. For instance, the INIT_MASK section may store data identifying (a) whether the first stage content is stored in flash memory; (b) the device flushed to resume file 98 according to block 258. Also, some of the non-paged data referenced at block 254 may be saved to first stage content 94, and the rest may be saved to second stage content 96. For example, first stage content 94 may get the pertinent non-paged data from the OS and application that had focus, and the rest of the non-paged data may go to second stage content 96.

OS 50 may then cause processing system 50 to power itself down, as indicated at block 260. The processes of FIGS. 4-6 may then be repeated as necessary, for instance starting at block 110 when processing system 20 starts its next initialization process.

Thus, in accordance with the above description, embodiments of the present invention may allow processing systems to restart from non-powered sleep states much more quickly than processing systems that use conventional resumption techniques. For instance, referring again to FIG. 2, a system according to the present disclosure may enter active mode and begin executing user mode threads after duration d1, in contrast to a conventional system, which may enter active mode only after duration d3. It has been projected, for instance, that a processing system with 3.4 GB of RAM may be restored to a usable state with the completion first stage loading in less that 4 seconds, based on flash memory with 16 megabytes (MB) per second data throughput, the flash memory containing 54.5 MB of first stage content, consisting of 22.4 MB of contextual data for the last active application and 32 MB of contextual data for the non-paged kernel context.

Furthermore, since a processing system may transition from a non-powered sleep state to an active state so quickly according to the present disclosure, a user, a vendor, or a system administrator may configure the processing system to use the non-powered sleep mode in circumstances that might, in a conventional system, call for a powered-sleep mode. Processing systems may even be designed to support (or configured to use) only non-powered sleep modes. For instance, embodiments of the present invention may allow processing systems to resume from a non-powered sleep modes as quickly as from powered sleep modes. Of course, non-powered sleep modes require little or no power to preserve state, while powered sleep modes require significant amounts of power to preserve state. Accordingly, processing systems that use non-powered sleep modes instead of one or more powered sleep modes may enjoy substantial power savings, relative to conventional systems. Such power savings may translate into additional benefits, such as increased effective standby power duration for battery powered system.

In addition, since the handshake mechanism allows the OS to communicate with the system firmware across a non-powered sleep state, the OS may dynamically adjust or reallocate roles and responsibilities between the firmware and the OS, to achieve improved performance. For example, the OS may adopt responsibility for initializing some of the system memory, certain system devices, etc.

In light of the principles and example embodiments described and illustrated herein, it will be recognized that the described embodiments can be modified in arrangement and detail without departing from such principles. For instance, although one embodiment is described above as using a hard disk and flash memory as nonvolatile storage, alternative embodiments may use only the hard disk, only flash memory, only some other kind of nonvolatile storage, or any suitable combination of nonvolatile storage technologies.

Also, although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. An article of manufacture comprising:
   at least one non-transitory machine-readable medium; and
   instructions stored in the at least one non-transitory machine-readable medium, wherein the instructions, when executed by a processing system having volatile memory, enable the processing system to perform operations comprising:
   transitioning the processing system from an active state to a sleeping state; and
   after transitioning the processing system from the active state to the sleeping state, performing resume operations in response to a start event, wherein the resume operations comprise:
   initializing, by system firmware, a first portion of the volatile memory but not a second portion of the volatile memory;
   transitioning the processing system from the sleeping state to the active state; and
   initializing, by an operating system (OS), the second portion of the volatile memory.

2. An article of manufacture according to claim 1, wherein the operations further comprise:
   after transition from the sleeping state to the active state has begun but before the OS has finished initializing the second portion of the volatile memory, executing at least one user mode thread.

3. An article of manufacture according to claim 1, wherein the operation of transitioning the processing system from the sleeping state to the active state is performed before the OS has finished initializing the second portion of the volatile memory.

4. An article of manufacture according to claim 1, wherein:
   the operation of transitioning the processing system from the sleeping state to the active state is performed after the system firmware has initialized the first portion of the volatile memory and before the OS has finished initializing the second portion of the volatile memory.

5. An article of manufacture according to claim 1, wherein the operations further comprise:
   the OS using a firmware variable to save data indicating that the OS has assumed responsibility for initializing the second portion of the volatile memory.

6. An article of manufacture according to claim 1, wherein:
   the resume operations further comprise determining, by the system firmware, whether the processing system is resuming from a non-powered sleeping state; and
   the system firmware initializes the first portion of the volatile memory but not the second portion of the volatile memory, in response to a determination that the processing system is resuming from the non-powered sleeping state.

7. An article of manufacture according to claim 6, wherein:
   the operations further comprise determining, by the system firmware, whether responsibility for initializing any of the volatile memory has been assigned to the OS; and
   the system firmware initializes the first portion of the volatile memory but not the second portion of the volatile memory in response to determinations that (a) the processing system is resuming from a non-powered sleeping state and (b) responsibility for initializing the second portion of volatile memory has been assigned to the OS.

8. An article of manufacture according to claim 7, wherein the operations further comprise:
   the OS using a firmware variable to save data indicating that the OS has assumed responsibility for initializing the second portion of the volatile memory.

9. A processing system comprising:
   a processor;
   volatile memory responsive to the processor;
   at least one non-transitory machine-readable medium responsive to the processor; and
   instructions stored in the at least one non-transitory machine-readable medium, wherein the instructions, when executed by the processing system, enable the processing system to perform operations comprising:
      transitioning the processing system from an active state to a sleeping state; and
      after transitioning the processing system from the active state to the sleeping state, performing resume operations in response to a start event, wherein the resume operations comprise:
         initializing, by system firmware, a first portion of the volatile memory but not a second portion of the volatile memory;
         transitioning the processing system from the sleeping state to the active state; and
         initializing, by an operating system (OS), the second portion of the volatile memory.

10. A processing system according to claim 9, wherein the operations further comprise:
    after transition from the sleeping state to the active state has begun but before the OS has finished initializing the second portion of the volatile memory, executing at least one user mode thread.

11. A processing system according to claim 9, wherein the operation of transitioning the processing system from the sleeping state to the active state is performed before the OS has finished initializing the second portion of the volatile memory.

12. A processing system according to claim 9, wherein:
    the operation of transitioning the processing system from the sleeping state to the active state is performed after the system firmware has initialized the first portion of the volatile memory and before the OS has finished initializing the second portion of the volatile memory.

13. A processing system according to claim 9, wherein the operations further comprise:
    the OS using a firmware variable to save data indicating that the OS has assumed responsibility for initializing the second portion of the volatile memory.

14. A processing system according to claim 9, wherein:
    the resume operations further comprise determining, by the system firmware, whether the processing system is resuming from a non-powered sleeping state; and
    the system firmware initializes the first portion of the volatile memory but not the second portion of the volatile memory, in response to a determination that the processing system is resuming from the non-powered sleeping state.

15. A processing system according to claim 14, wherein:
    the operations further comprise determining, by the system firmware, whether responsibility for initializing any of the volatile memory has been assigned to the OS; and
    the system firmware initializes the first portion of the volatile memory but not the second portion of the volatile memory in response to determinations that (a) the processing system is resuming from a non-powered sleeping state and (b) responsibility for initializing the second portion of volatile memory has been assigned to the OS.

16. A processing system according to claim 15, wherein the operations further comprise:
    the OS using a firmware variable to save data indicating that the OS has assumed responsibility for initializing the second portion of the volatile memory.

17. An article of manufacture comprising:
    at least one non-transitory machine-readable medium; and
    instructions stored in the at least one non-transitory machine-readable medium, wherein the instructions, when executed by a processing system having volatile memory, enable the processing system to perform operations comprising:
       while the processing system is in an active state, executing a program on the processing system;
       transitioning the processing system from the active state to a sleeping state;
       after transitioning the processing system from the active state to the sleeping state, performing resume operations in response to a start event, wherein:
          the resume operations comprise consecutive first and second stage loading processes;
          the first stage loading process comprises:
             initializing, by system firmware, a first portion of the volatile memory but not a second portion of the volatile memory; and
             after initializing the first portion of the volatile memory, loading first stage resume content into the volatile memory, wherein the first stage resume content comprises data for the program; and the second stage loading process comprises operations to be performed by an operating system (OS), wherein the second stage loading process comprises initializing, by the OS, the second portion of the volatile memory; and after the first stage loading process has begun but before the second stage loading process has finished, using the data for the program to present a user interface.

18. An article of manufacture according to claim 17, wherein the operations further comprise:

after the first stage loading process has begun but before the second stage loading process has finished, executing at least one user mode thread.

19. A processing system comprising:

a processor;

volatile memory responsive to the processor;

at least one non-transitory machine-readable medium responsive to the processor; and instructions stored in the at least one non-transitory machine-readable medium, wherein the instructions, when executed by the processing system, enable the processing system to perform operations comprising:

while the processing system is in an active state, executing a program on the processing system;

transitioning the processing system from the active state to a sleeping state;

after transitioning the processing system from the active state to the sleeping state, performing resume operations in response to a start event, wherein:

the resume operations comprise consecutive first and second stage loading processes;

the first stage loading process comprises:

initializing, by system firmware, a first portion of the volatile memory but not a second portion of the volatile memory; and after initializing the first portion of the volatile memory, loading first stage resume content into the volatile memory, wherein the first stage resume content comprises data for the program; and the second stage loading process comprises operations to be performed by an operating system (OS), wherein the second stage loading process comprises initializing, by the OS, the second portion of the volatile memory; and after the first stage loading process has begun but before the second stage loading process has finished, using the data for the program to present a user interface.

20. A processing system according to claim 19, wherein the operations further comprise:

after the first stage loading process has begun but before the second stage loading process has finished, executing at least one user mode thread.

* * * * *